(12) United States Patent
Morofuji

(10) Patent No.: US 11,025,806 B2
(45) Date of Patent: Jun. 1, 2021

(54) IMAGING APPARATUS WITH COVER CAPABLE OF CHANGING REFLECTANCE OF SURFACE

(71) Applicant: CANON KABUSHIKI KAISHA, Tokyo (JP)

(72) Inventor: Tsuyoshi Morofuji, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/374,513

(22) Filed: Apr. 3, 2019

(65) Prior Publication Data

US 2019/0312998 A1 Oct. 10, 2019

(30) Foreign Application Priority Data

Apr. 6, 2018 (JP) .............................. JP2018-073981

(51) Int. Cl.
*H04N 5/225* (2006.01)
*G02B 5/00* (2006.01)
*G02B 5/08* (2006.01)
*G08B 13/196* (2006.01)
*H04N 5/30* (2006.01)

(52) U.S. Cl.
CPC ........... *H04N 5/2254* (2013.01); *G02B 5/003* (2013.01); *G02B 5/08* (2013.01); *G08B 13/19619* (2013.01); *G08B 13/19626* (2013.01); *H04N 5/30* (2013.01)

(58) Field of Classification Search
CPC ............. H04N 5/2252; H04N 5/22521; H04N 5/2254; H04N 5/2257; H04N 5/30; H04N 7/18; H01L 27/3232; G08B 13/19617; G08B 13/19619; G08B 13/19626; G08B 13/1963; G08B 13/19632; G08B 13/19634; G08B 18/001; G02F 1/15; G02B 5/003; G02B 5/08
See application file for complete search history.

(56) References Cited

U.S. PATENT DOCUMENTS

| | | | | |
|---|---|---|---|---|
| 5,355,284 A | * | 10/1994 | Roberts | ..................... F21V 9/00 362/23.19 |
| 8,098,142 B2 | * | 1/2012 | Schofield | ................ B60R 1/088 340/425.5 |
| 10,509,298 B2 | * | 12/2019 | Yaney | .................. H04N 5/2254 |
| 2001/0022550 A1 | * | 9/2001 | Steffel | .................. B60K 28/066 340/426.1 |

(Continued)

FOREIGN PATENT DOCUMENTS

JP 2015-207927 A 11/2015
JP 2015207927 A * 11/2015

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An imaging apparatus includes a camera, a cover covering the camera and capable of changing reflectance of a surface thereof, and a control unit configured to control the reflectance of the surface of the cover so as to be switchable between a first mode and a second mode. The first mode causes light to reflect at the surface of the cover. The second mode causes light to pass through the cover and the reflectance in which is different from that in the first mode.

11 Claims, 11 Drawing Sheets

(56) References Cited

U.S. PATENT DOCUMENTS

| | | | | |
|---|---|---|---|---|
| 2006/0244583 A1* | 11/2006 | Kawada | ............... | H04N 5/2254 340/468 |
| 2011/0025906 A1* | 2/2011 | Shurboff | .................. | G03B 9/08 348/367 |
| 2011/0158637 A1* | 6/2011 | Jung | ...................... | G03B 15/03 396/535 |
| 2014/0178060 A1* | 6/2014 | Saita | ...................... | G03B 17/02 396/241 |
| 2019/0188502 A1* | 6/2019 | Hermalyn | .......... | G06K 9/00791 |

* cited by examiner

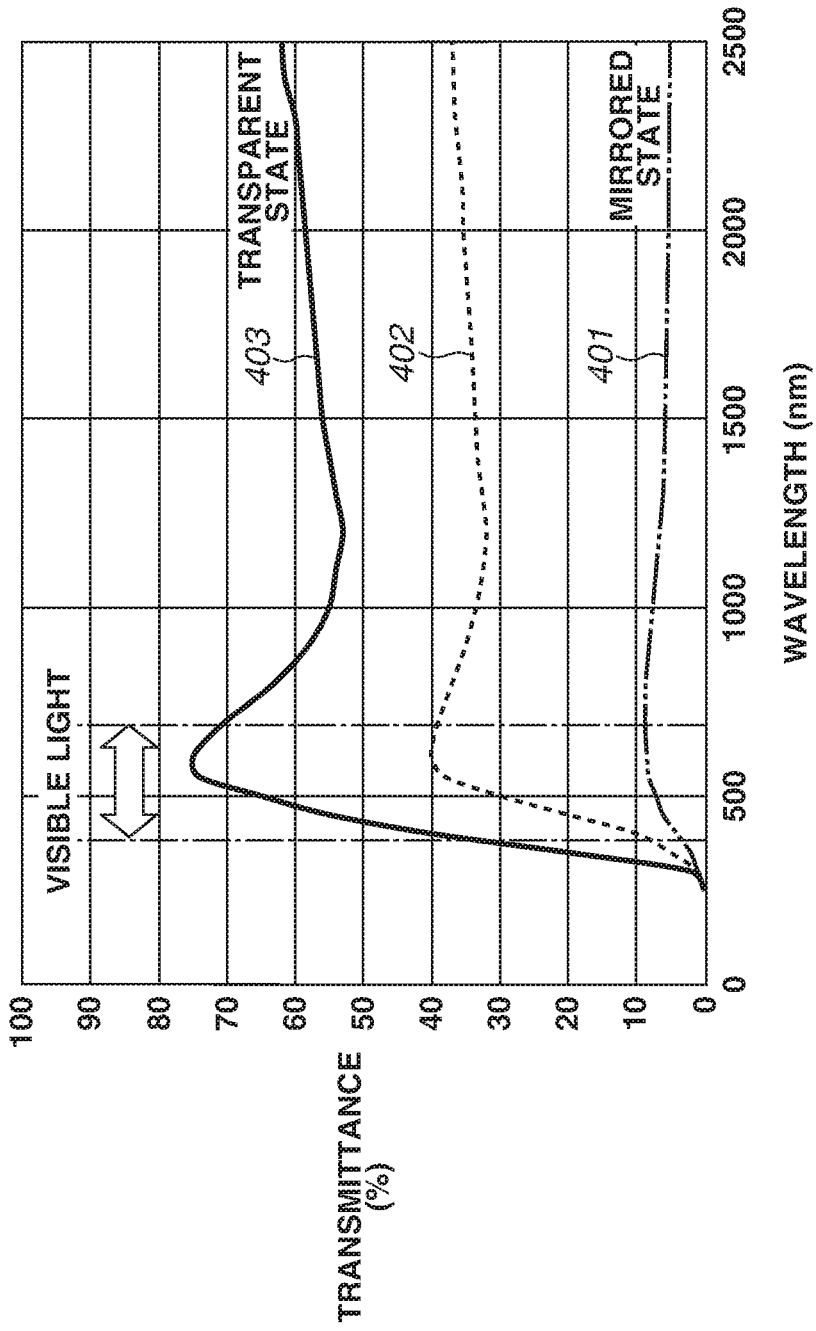

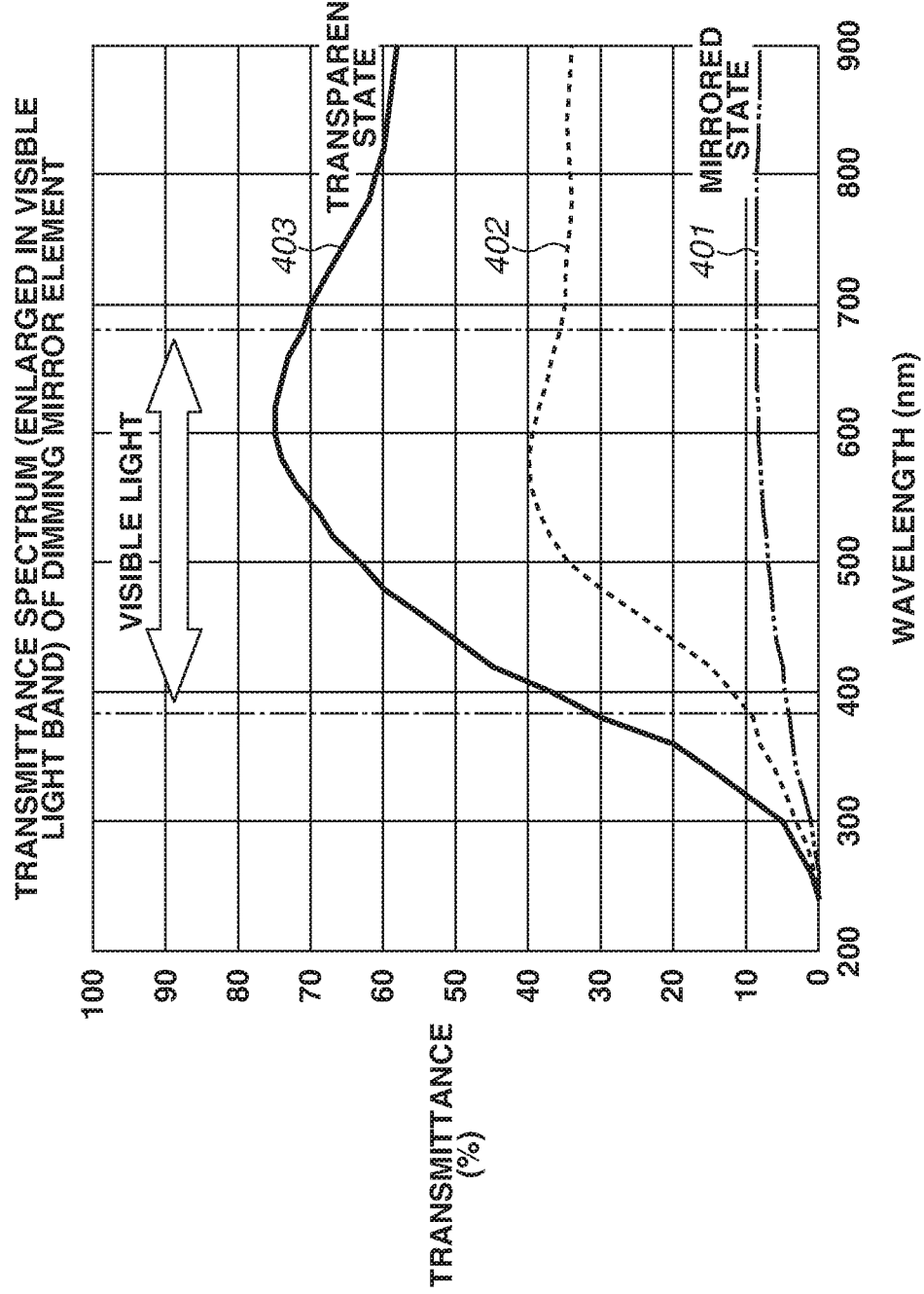

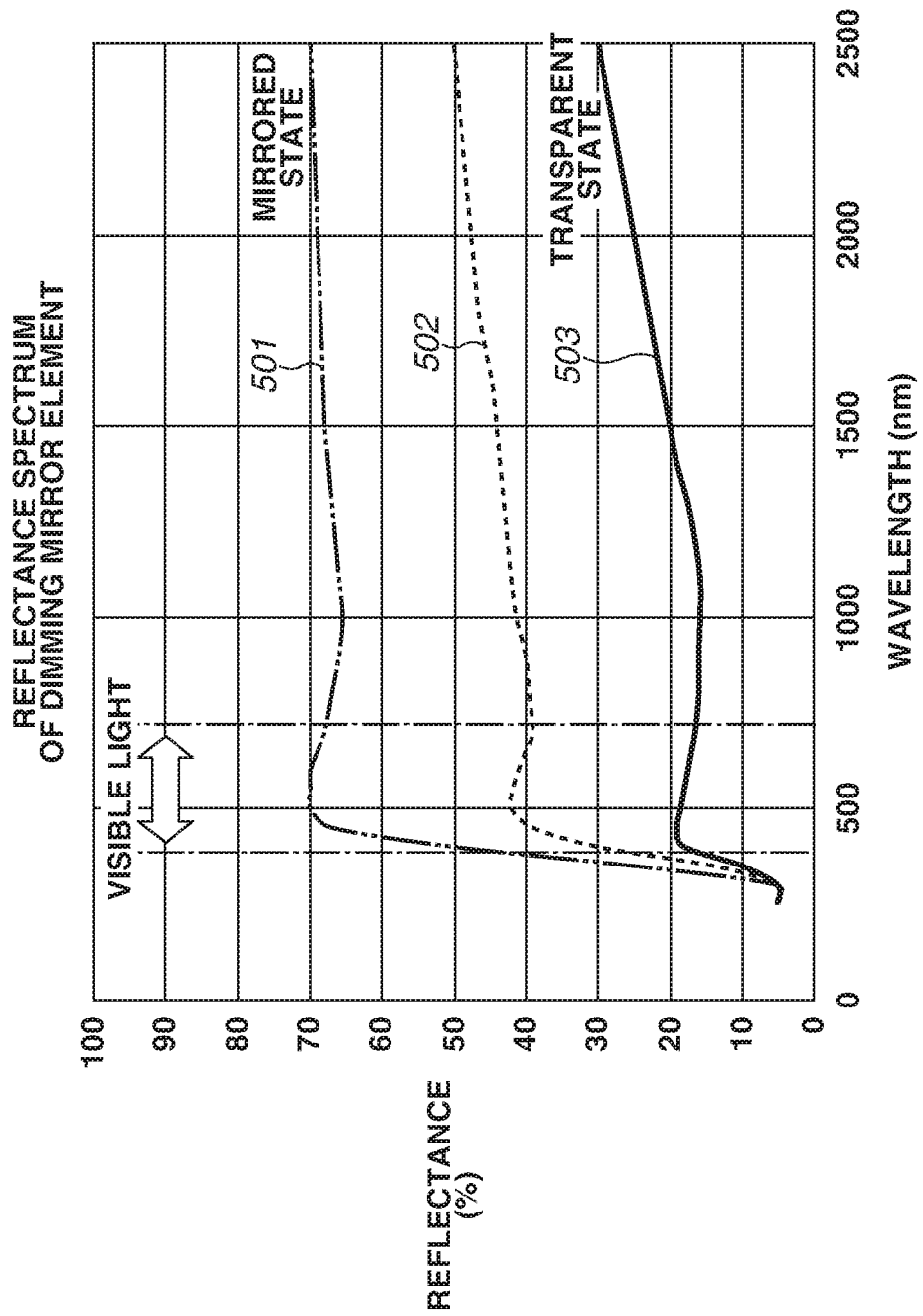

| TRANSMITTANCE (%) IN 550 nm | REFLECTANCE (%) IN 550 nm | G GAIN | B GAIN | R GAIN |
|---|---|---|---|---|
| WITHOUT DOME | — | 100 | 100 | 100 |
| — | — | — | — | — |
| — | — | — | — | — |
| 10 | 70 | 100 | 110 | 95 |
| 15 | 68 | 100 | 112 | 96 |
| 20 | 64 | 100 | 113 | 97 |
| 25 | 60 | 100 | 115 | 98 |
| 30 | 55 | 100 | 117 | 100 |
| 35 | 51 | 100 | 118 | 103 |
| 40 | 46 | 100 | 120 | 105 |
| 45 | 42 | 100 | 122 | 105 |
| 50 | 38 | 100 | 124 | 105 |
| 55 | 32 | 100 | 125 | 105 |
| 60 | 28 | 100 | 126 | 106 |
| 65 | 24 | 100 | 128 | 106 |
| 70 | 22 | 100 | 129 | 107 |
| 75 | 18 | 100 | 130 | 107 |
| — | — | — | — | — |
| — | — | — | — | — |
| — | — | — | — | — |
| — | — | — | — | — |
| — | — | — | — | — |

MIRRORED ↑ ↓ TRANSPARENT

IMAGING APPARATUS WITH COVER CAPABLE OF CHANGING REFLECTANCE OF SURFACE

BACKGROUND OF THE INVENTION

Field of the Invention

Aspects of the embodiments generally relate to control of surface reflectance in an imaging apparatus.

Description of the Related Art

In recent years, to monitor, for example, an illegal activity such as an act of stealing in a facility or building such as a shop or parking space, or an intrusion of a third party from the external, monitoring cameras have been arranged at, for example, various portions of the facility or building and fences surrounding the facility or building. Then, monitoring cameras are installed within the interior of the facility or building or arranged outside the facility or building. When a monitoring camera is installed, to protect the monitoring camera from attack by an intruder or exposure to the wind and rain, the monitoring camera is often equipped with a dome-shaped cover (dome cover) which covers the monitoring camera.

The dome cover, which covers a monitoring camera, is usually formed with a thickness of about several millimeters from a plastic material such as polymethylmethacrylate (PMMA) or polycarbonate (PC). Then, depending on the use application and purpose of monitoring cameras, dome covers having specifications different in transmittance, such as a transparent (clear) type dome cover and a smoke-color (smoke) type dome cover, are used. The clear type dome cover is required not only to assume the role of protecting a monitoring camera but also not to affect a captured image acquired by the monitoring camera, with an emphasis on transmittance or surface accuracy. On the other hand, the smoke type dome cover is a dome cover which is colored and reduced in transmittance for the purpose of acquiring an affinity for its surroundings in such a manner that the surroundings are unconscious of monitoring by the monitoring camera or the surroundings do not know the direction of monitoring or for the purpose of achieving an anti-crime effect. In this way, at the time of installation of a monitoring camera, depending on the use application and purpose thereof, selection between a clear type dome cover and a smoke type dome cover is performed.

Japanese Patent Application Laid-Open No. 2015-207927 discusses a dome cover which is made from an electrochromic dimming element, in which the quantity of transmitted light is controlled to switch between a clear state and a smoke state.

However, in a case where the dome cover is made from a light-absorption type electrochromic dimming element, when the dome cover enters a smoke state, the dome cover is colored with dark blue, thus absorbing light to perform dimming Therefore, an image acquired with the dome cover in the smoke state becomes a totally blue-tinged image. Moreover, depending on transmittance (optical density), a light spectrum (intensity distribution) varies, so that the color tone of an image to be acquired would change. In other words, in a case where the dome cover is made from a light-absorption type electrochromic dimming element, the image quality of a captured image may decrease.

SUMMARY OF THE INVENTION

Aspects of the embodiments are generally directed to providing an imaging apparatus capable of changing the state of a dome cover depending on a use application and purpose of a camera or an image sensor without allowing the image quality of a captured image to decrease.

According to an aspect of the embodiments, an imaging apparatus includes a camera or an image sensor, a cover covering the camera or the image sensor and capable of changing reflectance of a surface thereof, and a control unit configured to control the reflectance of the surface of the cover so as to be switchable between a first mode and a second mode. The first mode causes light to reflect at the surface of the cover. The second mode causes light to pass through the cover and the reflectance in which is different from that in the first mode.

Further features of the disclosure will become apparent from the following description of exemplary embodiments with reference to the attached drawings.

BRIEF DESCRIPTION OF THE DRAWINGS

FIG. 4A is a diagram of a transmittance spectrum of a dimming mirror element in a visible light band and an infrared band.

FIG. 4B is a diagram of a transmittance spectrum of the dimming mirror element in a visible light band.

FIG. 5 is a diagram of a reflectance spectrum of the dimming mirror element.

DESCRIPTION OF THE EMBODIMENTS

Various exemplary embodiments, features, and aspects of the disclosure will be described in detail below with reference to the drawings. Exemplary embodiments described below are merely examples of implementation of the disclosure and can be modified or altered as appropriate depending on configurations or various conditions of an apparatus or system to which the disclosure is applied, so that the disclosure is not limited to the following exemplary embodiments. Moreover, not all of the combinations of features described in the following exemplary embodiments are essential for solutions in the disclosure.

Hereinafter, a first exemplary embodiment of the disclosure is described with reference to FIG. 1 to FIG. 7.
<Outline of Camera System>

Figure 1:
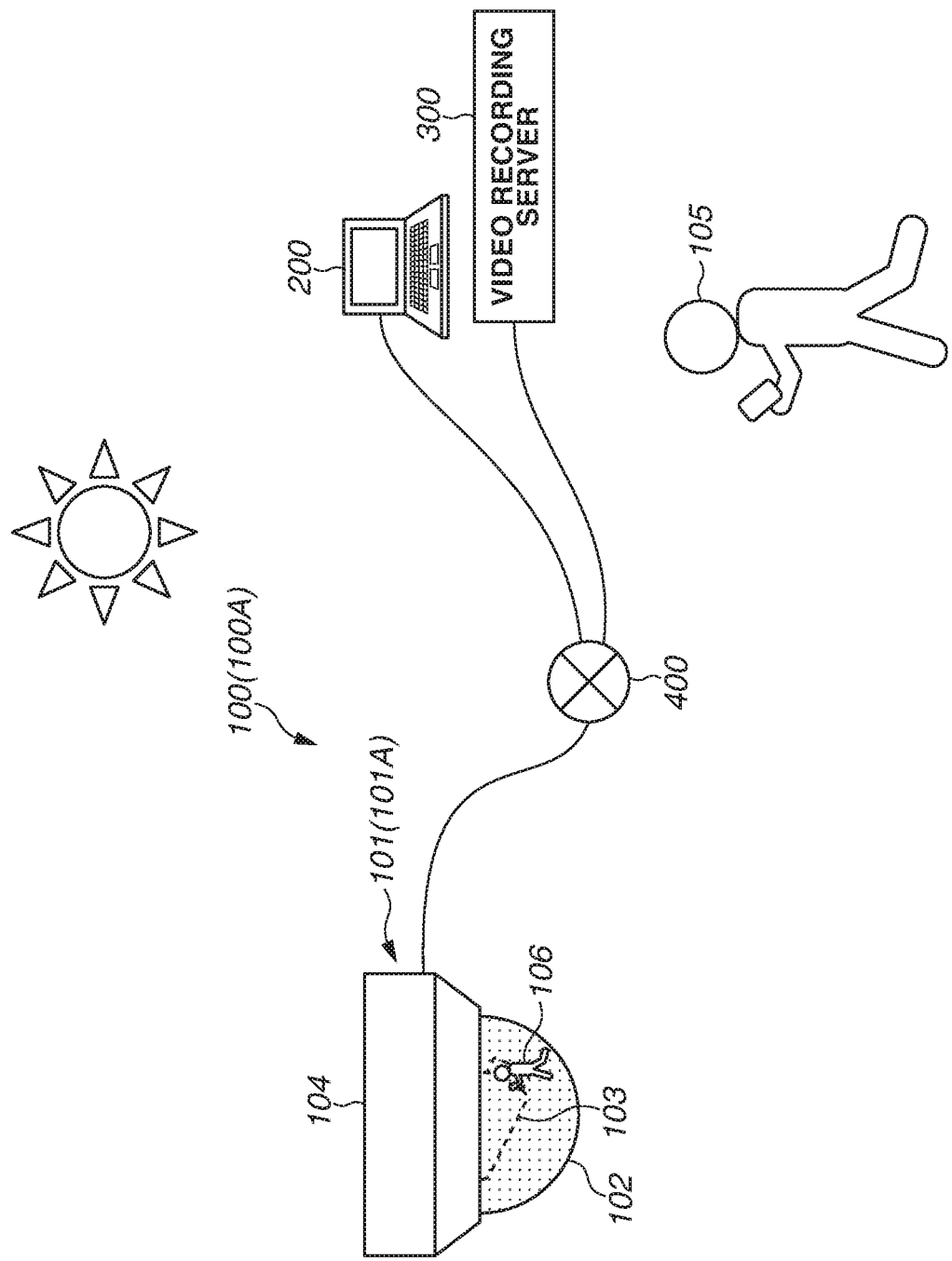
FIG. 1 is an outline diagram of a camera system according to a first exemplary embodiment.

FIG. 1 is a diagram illustrating an outline of a camera system 100 according to the first exemplary embodiment. The camera system 100 includes a monitoring camera apparatus 101, a client apparatus 200, and a video recording server 300. In the first exemplary embodiment, the monitoring camera apparatus 101 is connected to the client apparatus 200 and the video recording server 300 via a local area network (LAN) network 400, and is thus able to communicate with the client apparatus 200 and the video recording server 300. The monitoring camera apparatus 101 is able to transmit an acquired image to the client apparatus 200 and the video recording server 300. Moreover, the monitoring camera apparatus 101 receives input information or an instruction from the client apparatus 200, and is thus able to start a monitoring operation or start pan-tilt-zoom (PTZ) control based on the input information or the instruction. The client apparatus 200 is equipped with a display unit, which displays a video image received from the monitoring camera apparatus 101. In the first exemplary embodiment, the client apparatus 200 is a personal computer. Furthermore, the client apparatus 200 can be, for example, a laptop computer, a tablet computer, or a smartphone. The monitoring camera apparatus 101 is an example of an imaging apparatus.

The monitoring camera apparatus 101 includes a dome cover 102, a monitoring camera or an image sensor 103, and a monitoring camera apparatus body 104. The dome cover 102 is mounted on the monitoring camera apparatus body 104 in such a way as to cover the front surface of the monitoring camera or the image sensor 103 (the surface on the side of a lens thereof). The monitoring camera apparatus body 104 supports the monitoring camera 103 in such a way as to enable the monitoring camera 103 to perform a pan operation and a tilt operation. For example, the monitoring camera apparatus 101 is installed outdoors. The monitoring camera apparatus 101 is an apparatus which performs image capturing and monitoring of a monitoring target 105. In the first exemplary embodiment, the monitoring target is assumed to be a person. Furthermore, the monitoring camera apparatus 101 is further equipped with elements other than the dome cover 102, the monitoring camera 103, and the monitoring camera apparatus body 104. Details of the monitoring camera apparatus 101 are described below with reference to FIG. 3.

The dome cover 102 is a hemispherical cover. The dome cover 102 includes a glass plate portion and a thin-film portion. The dome cover 102 is mounted on the monitoring camera apparatus body 104, but is attachable to and detachable from the monitoring camera apparatus body 104. The dome cover 102 is configured with a dimming mirror element. The dimming mirror element is an element which is switched between a mirrored state (mirror state) and a transparent state (clear state) in response to a voltage being applied thereto. Thus, the dome cover 102 is able to selectively assume the mirrored state and the clear state. FIG. 1 illustrates the dome cover 102 being in the mirrored state. The mirrored state is a state in which the reflectance of the dome cover 102 is high, so that the dome cover 102 becomes like a mirror. In the mirrored state, the inner portion (inner side) of the dome cover 102 is not visible from the outside. Since, in the mirrored state, the dome cover 102 is not transparent but chromatic, the mirrored state can be said to be a state in which the dome cover 102 is colored. The clear state is a state in which the reflectance of the dome cover 102 is low, so that the dome cover 102 becomes transparent. Furthermore, the dimming mirror element in the mirrored state performs dimming by the thin-film portion entering the mirrored state and thus reflecting light. The dome cover 102 is a cover which covers the monitoring camera 103 and the reflectance of the surface of which is changeable or switchable between two operational modes. Moreover, the mirrored state of the dimming mirror element can be referred to as a "first mode", and the transparent state thereof can be referred to as a "second mode". The mirrored state is an example of a state of causing light to reflect at the surface of the dome cover 102, and the transparent state is an example of a state of causing light to pass through the dome cover 102.

The monitoring camera, or the image sensor, 103 is equipped with a change-over mechanism for an infrared cut filter in such a way as to enable performing day and night image capturing. During the day, in which a sufficient light quantity is able to be obtained, the monitoring camera 103 performs image capturing with the infrared cut filter inserted into an optical path, and, during the night, in which a sufficient light quantity is not able to be obtained, the monitoring camera 103 performs image capturing using infrared light with the infrared cut filter retracted from the optical path.

FIG. 1 illustrates the behavior of monitoring in the daytime performed by the monitoring camera apparatus 101. During monitoring in the daytime, the dome cover 102 is in the mirrored state with the reflectance of the dome cover 102 set high (the transmittance thereof set low). Due to the mirror effect of the dome cover 102, the monitoring camera 103, which is located inside the dome cover 102, is not viewable by the person 105, which is a monitoring target. In the mirrored state, since the monitoring camera 103, which is located inside the dome cover 102, is not able to be viewed from the outside, the monitoring camera 103 is indicated by a dashed line in FIG. 1. Moreover, in the mirrored state, a mirror image 106 of the person 105 is reflected in the dome cover 102. In this way, in the state illustrated in FIG. 1, such an anti-crime effect that the person 105 is prevented from becoming conscious of the monitoring camera apparatus 101 or the person 105 is prevented from knowing the direction of monitoring is achieved.

Figure 2:
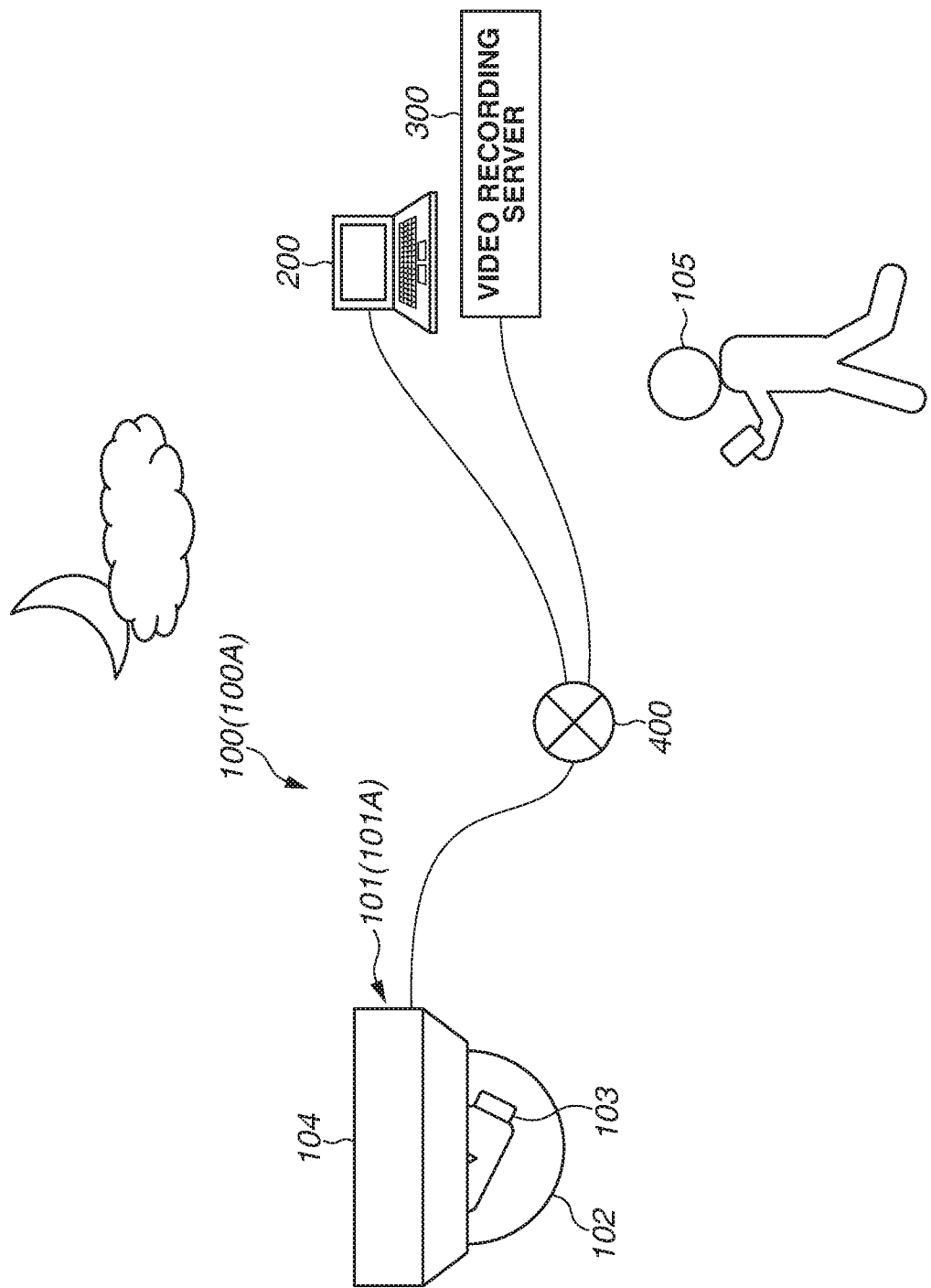
FIG. 2 is an outline diagram of night watch (night monitoring) performed by the camera system according to the first exemplary embodiment.

FIG. 2 illustrates the behavior of monitoring in the night-time. During monitoring in the night-time, the dome cover 102 is in the transparent (clear) state with the reflectance of the dome cover 102 set low (the transmittance thereof set high). In the night-time, since the light quantity is small, the dome cover 102 is set transparent, thus enabling sufficient light to reach the monitoring camera 103. In other words, image capturing by the monitoring camera 103 is prioritized over the anti-crime effect described with reference to FIG. 1. Moreover, in a case where night-vision monitoring is performed in the night-time, the monitoring camera 103 performs irradiation of the monitoring target using infrared illumination. At that time, the monitoring camera 103 retracts the infrared cut filter from the optical path. In night-vision monitoring, the monitoring camera 103 brings the dome cover 102 into the clear state, thus being able to perform high-sensitivity image capturing. As illustrated in FIG. 2, in the clear state, since the monitoring camera 103, which is located inside the dome cover 102, is able to be viewed from the outside, the monitoring camera 103 is indicated by a solid line.

In this way, the monitoring camera apparatus 101 is able to selectively use a mode of increasing an anti-crime effect by causing the mirror image 106 of the person 105 near the dome cover 102 to be reflected in the dome cover 102 and a mode of prioritizing image capturing in a case where the light quantity is small, such as in the night-time.

<Relationship Between Transmittance and Light Spectrum>

The dome cover 102 is configured with a dimming mirror element, and is colored at the time of dimming. Moreover, since, depending on transmittance (optical density), a light spectrum (intensity distribution) varies, a change in color tone due to coloring occurs in the captured image. Since the monitoring camera 103 in the first exemplary embodiment performs image capturing while receiving transmitted light passing through the dome cover 102, the captured image obtained by the monitoring camera 103 is affected by a change in color tone due to coloring of the dome cover 102. Moreover, due to coloring of the dome cover 102, an influence on the performance of, for example, light source determination or light source presetting also occurs.

Therefore, in the first exemplary embodiment, in order to absorb a change in light spectrum corresponding to the transmittance (in order to appropriately deal with a change in light spectrum), color balance adjustment corresponding to the transmittance is performed. In other words, in addition to changing of the transmittance (reflectance), adjustment (changing) of color balance corresponding thereto is performed, so that an influence on a captured image obtained by the monitoring camera 103 caused by coloring of the dome cover 102 is removed or reduced.

<Configuration of Monitoring Camera Apparatus>

Next, a configuration of the monitoring camera apparatus 101 and the flow of signals, such as a video signal, a control signal, and a detection signal, therein are described with reference to FIG. 3.

The monitoring camera apparatus 101 includes the dome cover 102, the monitoring camera 103, a captured image processing unit 305, a network processing unit 306, a controller 307, a dimming mirror control unit 308, an external environment light sensor 309, and an internal environment light sensor 310.

Figure 3:
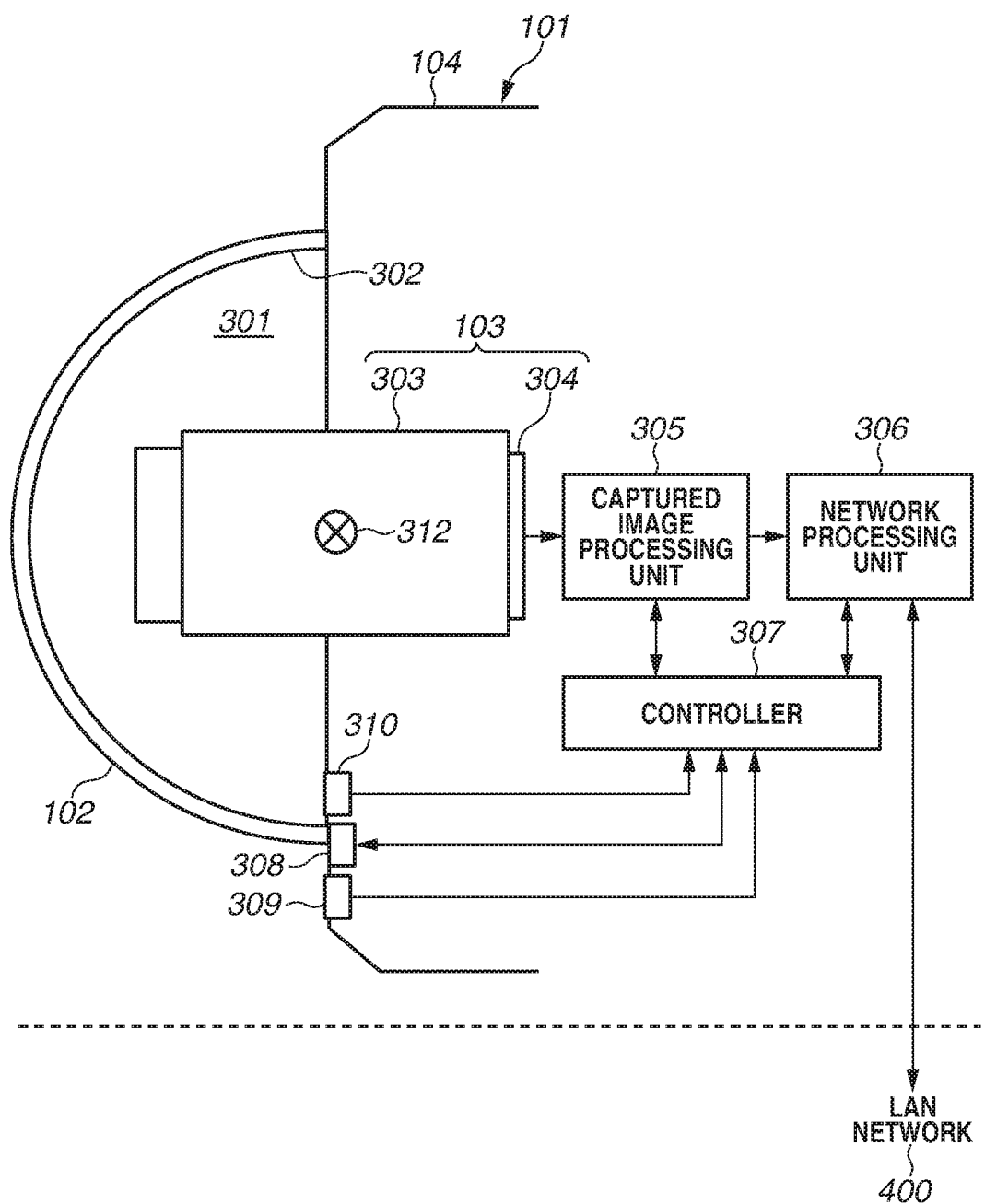
FIG. 3 is a block diagram of a monitoring camera apparatus according to the first exemplary embodiment.

In FIG. 3, the dome cover 102 is illustrated with a cross-section taken along the direction in which the monitoring camera 103 performs a tilt operation, and the dome cover 102 has a semicircular shape in cross-section. The dome cover 102 is provided in such a way as to cover, at least, the front surface of the monitoring camera 103. An empty space 301 is formed between the dome cover 102 and the monitoring camera 103. Moreover, an antireflection film coating 302 is applied to the inner surface (the surface on the camera side) of the dome cover 102, so that the reflection of the monitoring camera 103 in the dome cover 102 is reduced.

The monitoring camera 103 includes a lens unit 303 and an image sensor 304. The lens unit 303 includes a plurality of lenses. The image sensor 304 is capable of performing color image capturing. Light from the monitoring target 105 (a video image thereof) is projected onto the image sensor 304 via the lens unit 303. The image sensor 304 converts the projected image (light) into an electrical signal, and sends the electrical signal to the captured image processing unit 305.

The monitoring camera 103 further includes a tilt shaft 312, which is used to perform a tilt operation, and a pan shaft (not illustrated), which is used to perform a pan operation (swiveling operation). The lens unit 303 and the image sensor 304 perform a tilt operation around the tilt shaft 312 and performs a pan operation around the pan shaft. The monitoring camera 103 further includes a mechanism (not illustrated) required to perform a tilt operation and a pan operation. The monitoring camera 103 further includes a zoom mechanism.

A part of the monitoring camera 103, the captured image processing unit 305, the network processing unit 306, and the controller 307 are housed in the monitoring camera apparatus body 104. Each of the dimming mirror control unit 308, the external environment light sensor 309, and the internal environment light sensor 310 is mounted on the monitoring camera apparatus body 104 in such a manner that a part thereof is exposed on the surface of the monitoring camera apparatus body 104.

The captured image processing unit 305 receives an electrical signal from the image sensor 304. The captured image processing unit 305 performs processing operations, such as color separation, white balance, and gamma correction, on the received electrical signal, and then sends the processed signal to the network processing unit 306. The captured image processing unit 305 also sends the processed signal to the controller 307.

The network processing unit 306 converts the signal received from the captured image processing unit 305 into a predetermined-format video signal, and performs compression processing on the video signal. The network processing unit 306 delivers the video signal subjected to compression processing to the client apparatus 200 and the video recording server 300 via the LAN network 400. The video recording server 300 records the received video signal. The client apparatus 200 displays the received video signal on a display unit of the client apparatus 200. Delivery of the video signal from the network processing unit 306 to the client apparatus 200 is performed via real-time delivery or video delivery. The network processing unit 306 also sends the video signal subjected to compression processing to the controller 307.

The controller 307 is composed of, for example, one or a plurality of central processing units (CPUs) and a storage unit. The controller 307 performs various processing operations based on a program stored in the storage unit. The storage unit is configured with, for example, a read-only memory (ROM), a random access memory (RAM), a hard disk drive (HDD), a flash memory, or a detachable storage medium such as a Secure Digital (SD) card.

The dimming mirror control unit 308 switches the dome cover 102 between the mirrored state and the transparent state by applying a voltage of, for example, several volts to the dome cover 102. Moreover, in the first exemplary embodiment, the dimming mirror control unit 308 is able to detect whether the dome cover 102 is mounted at a predetermined position of the monitoring camera apparatus 101. Thus, the dimming mirror control unit 308 also serves as a dome attachment/detachment detection unit. The dimming mirror control unit 308 transmits a result of the detection concerning the attachment/detachment state of the dome cover 102 to the controller 307. The controller 307 determines whether the dome cover 102 is attached to the monitoring camera apparatus body 104, based on a result of the detection transmitted from the dimming mirror control unit 308. Then, the controller 307 can adjust the color balance of a captured image based on the transmitted result of the detection.

The external environment light sensor 309 is a sensor which detects the quantity of light outside the dome cover 102 (external environment light). The external environment light sensor 309 transmits a result of the detection (external environment light quantity) to the controller 307.

The internal environment light sensor 310 is a sensor which detects the quantity of light inside the dome cover 102 (internal environment light). The internal environment light sensor 310 transmits a result of the detection (internal environment light quantity) to the controller 307.

<Principle of Operation of Dimming Mirror Element>

Next, the principle of operation of the dimming mirror element is described. The dimming mirror element includes a dimming mirror layer. When a voltage is applied to the dimming mirror layer in such a manner that hydrogen ions move, the dimming mirror layer and the hydrogen ions having moved react to each other and change into a metallic hydride. Since the metallic hydride is transparent, the dimming mirror element changes from the mirrored state to the transparent state. This change is reversible, so that, when the polarity of a voltage to be applied is reversed, the dimming mirror element returns to the mirrored state. The dimming mirror element is able to control the amount of transmission or the amount of reflection of light by switching voltage application in the above-mentioned way.

<Transmittance Spectrum>

FIG. 4A and FIG. 4B each illustrate transmittance spectra in the transparent state and the mirrored state of the dimming mirror element. More specifically, FIG. 4A illustrates the spectra in a wavelength range including a visible light band and an infrared band, and FIG. 4B illustrate the spectra in a narrowed down range of only the visible light band (the visible light band in FIG. 4A being enlarged). In the graphs of FIG. 4A and FIG. 4B, the vertical axis indicates transmittance (%), and the horizontal axis indicates wavelength (nm). A curve 401 is a transmittance spectrum in the mirrored state, and a curve 403 is a transmittance spectrum in the transparent state. Moreover, a curve 402 is a transmittance spectrum in an intermediate state. The curve 402 is a transmittance spectrum in which the visible light transmittance in a wavelength of 550 nm is 40%.

<Reflectance Spectrum>

FIG. 5 illustrates reflectance spectra in the transparent state and the mirrored state of the dimming mirror element. In the graph of FIG. 5, the vertical axis indicates reflectance (%), and the horizontal axis indicates wavelength (nm). A curve 501 is a reflectance spectrum in the mirrored state, and a curve 503 is a reflectance spectrum in the transparent state. A curve 502 is a reflectance spectrum in an intermediate state, in which the visible light reflectance in a wavelength of 550 nm is 40%.

It is understandable from the curves illustrated in FIG. 4A, FIG. 4B, and FIG. 5 that, in the dimming mirror element, a blue component becomes weak and a yellow tinge becomes strong in the visible light transmission band.

<Internal Operation of Monitoring Camera Apparatus>

Figure 6:
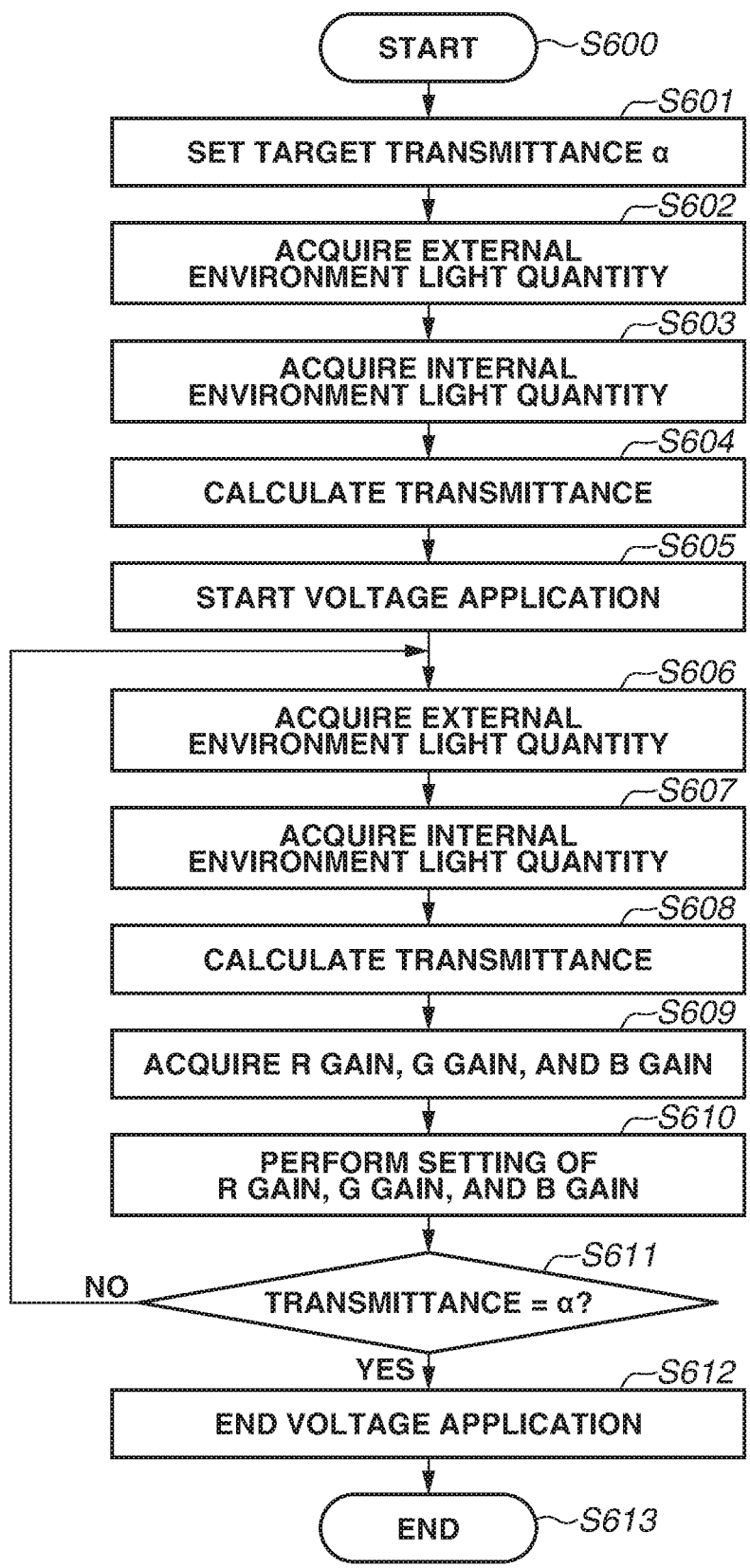
FIG. 6 is a flowchart illustrating an operation of the monitoring camera apparatus according to the first exemplary embodiment.

Next, an example of an internal operation (processing) of the monitoring camera apparatus 101 in the first exemplary embodiment is described with reference to the flowchart of FIG. 6. The processing illustrated in the flowchart of FIG. 6 is performed by the CPU, which configures the controller 307, executing a program stored in the storage unit.

In step S600, the processing starts. The processing starts in response to, for example, the monitoring camera apparatus 101 being powered on. Alternatively, the processing starts in response to an instruction from the client apparatus 200.

In step S601, the controller 307 sets a target transmittance α. For example, the controller 307 sets the target transmittance α based on a detection value obtained by an illuminance sensor installed outside the dome cover 102.

In step S602, the controller 307 acquires an external environment light quantity by receiving the external environment light quantity about the dome cover 102 from the external environment light sensor 309.

In step S603, the controller 307 acquires an internal environment light quantity by receiving the internal environment light quantity about the dome cover 102 from the internal environment light sensor 310.

In step S604, the controller 307 calculates the current transmittance from the external environment light quantity acquired in step S602 and the internal environment light quantity acquired in step S603.

In step S605, the controller 307 determines the polarity of a voltage which is to be applied to the dome cover 102, from the current transmittance and the target transmittance α, and then starts voltage application.

In step S606, the controller 307 acquires an external environment light quantity by receiving the external environment light quantity about the dome cover 102 from the external environment light sensor 309.

In step S607, the controller 307 acquires an internal environment light quantity by receiving the internal environment light quantity about the dome cover 102 from the internal environment light sensor 310.

In step S608, the controller 307 calculates the current transmittance from the external environment light quantity acquired in step S606 and the internal environment light quantity acquired in step S607.

Figure 7:
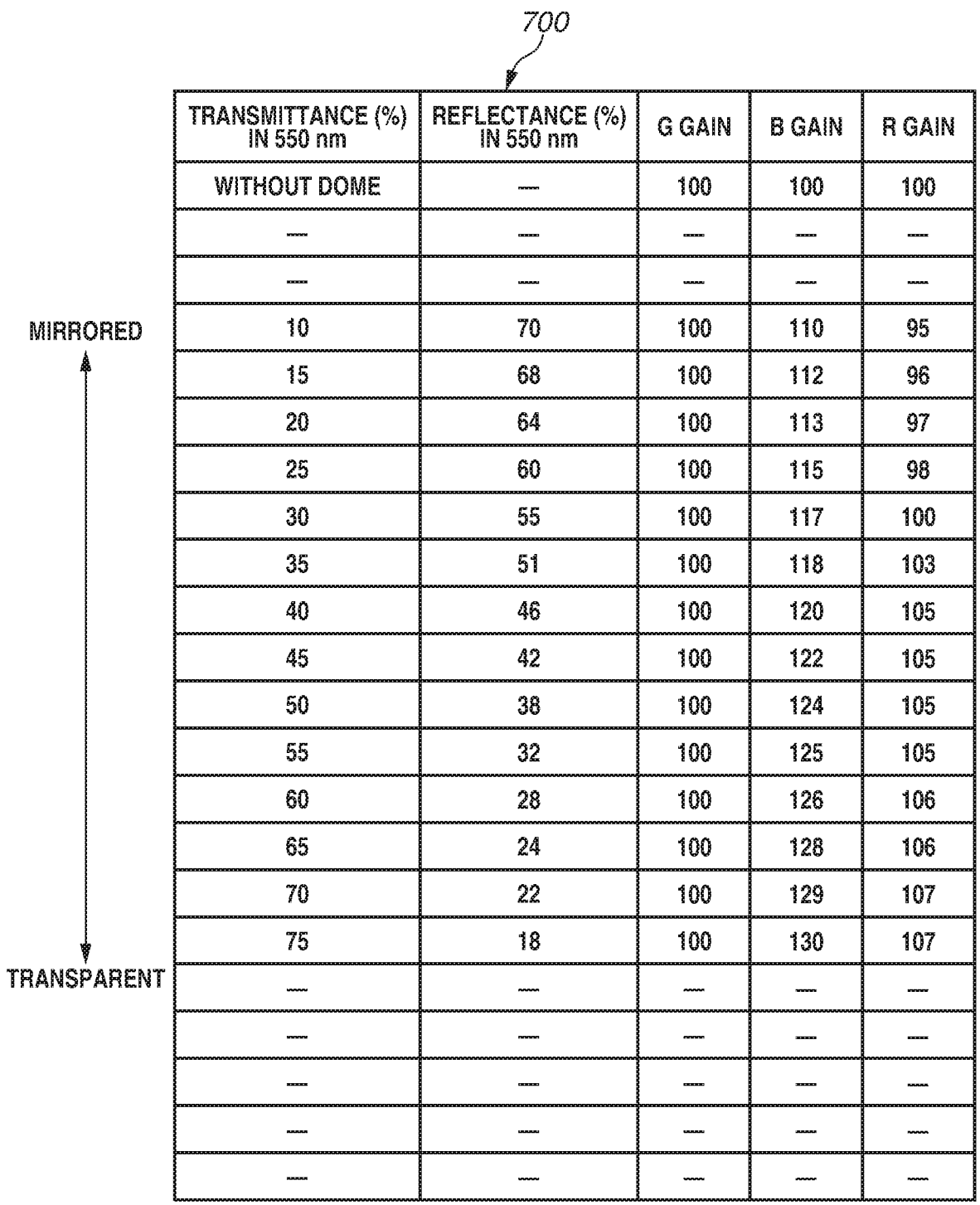
FIG. 7 is a diagram illustrating a table of red (R), green (G), and blue (B) gains relative to transmittance (reflectance) which is used in the first exemplary embodiment.

In step S609, the controller 307 refers to a table 700 illustrated in FIG. 7. The table 700 shows an example of a color balance correction (red, green, and blue (RGB) gain corrections) corresponding to the transmittance (reflectance) of the dome cover 102. The controller 307 acquires RGB gains for correcting color balance from the table 700 based on the current transmittance calculated in step S608.

In step S610, the controller 307 performs setting (changing or adjustment) of RGB gains with use of the RGB gains acquired in step S609, thus performing color balance correction. For example, the controller 307 issues an instruction to the captured image processing unit 305 to set the RGB gains acquired in step S609 to RGB gains used for image processing to be performed by the captured image processing unit 305.

In step S611, the controller 307 determines whether the current transmittance is equal to the target transmittance α. If it is determined that the current transmittance is equal to the target transmittance α (YES in step S611), the controller 307 advances the processing to step S612. If it is determined that the current transmittance is not equal to the target transmittance α (NO in step S611), the controller 307 returns the processing to step S606.

In step S612, the controller 307 ends voltage application, thus maintaining the current transmittance. Then, the controller 307 advances the processing to step S613, thus ending the processing.

Furthermore, the controller 307 can issue an instruction for a transmittance (reflectance) target value to the dimming mirror control unit 308, and the dimming mirror control unit 308 can control the transmittance (reflectance) of the dome cover 102.

While, in the above-described exemplary embodiment, a case where the dome cover 102 is configured with a dimming mirror element has been described, the first exemplary embodiment can also be applied to a case where the dome cover 102 is configured with a light-absorption type electrochromic dimming element. Even in a case where the dome cover 102 is configured with a light-absorption type electrochromic dimming element, since the light spectrum varies according to the transmittance, a change in color tone caused by coloring may occur or the performance of, for example, light source determination may be affected. Even in this case, performing color balance adjustment (setting) as in the first exemplary embodiment enables removing or reducing, for example, an influence on a captured image.

Furthermore, with regard to the light-absorption type electrochromic dimming element, since a technique which enables transmittance control using a voltage value or transmittance control using an applied voltage waveform is known, methods other than the above-mentioned method can be considered as transmittance control.

Moreover, in the case of installation of the monitoring camera apparatus 101, it may be desirable that the dome cover 102 be selectable from a plurality of types of dome covers. For example, it is desirable that the dome cover 102 can be configured with one selected from, for example, a dimming mirror element, a light-absorption type electrochromic dimming element, a smoke dome, and a clear dome. Therefore, a configuration which detects or identifies which of a dimming mirror element, a light-absorption type electrochromic dimming element, a smoke dome, and a clear dome the dome cover 102 is can be employed. Then, color balance correction corresponding to a result of such detection or identification (in other words, adapted to the physical property or optical property of the dome cover 102) can be performed. Identification of the type of the dome cover 102 is able to be performed by preset selection performed at the time of installation of the monitoring camera apparatus 101. Moreover, in a case where the dome cover 102 has a non-volatile memory, the type of the dome cover 102 and the presence or absence of control items are transmitted and input to the non-volatile memory. Then, the controller 307 can acquire the type of the dome cover 102 based on information input to the non-volatile memory and thus perform changing of control over, for example, color balance.

While, in the above-described exemplary embodiment, the internal environment light quantity of the dome cover 102 is detected by the internal environment light sensor 310, the internal environment light quantity of the dome cover 102 does not need to be detected by the internal environment light sensor 310. For example, the light quantity detected by the image sensor 304 can also be used as the internal environment light quantity. In this case, since the internal environment light sensor 310 does not need to be provided, the number of components of the monitoring camera apparatus 101 can be reduced.

While, in the above-described exemplary embodiment, the monitoring camera apparatus 101 is installed outdoors, the first exemplary embodiment can also be applied to a case where the monitoring camera apparatus 101 is installed indoors or in a room. Moreover, while it is described that FIG. 1 illustrates the behavior of monitoring in the daytime, the term "daytime" is a typical example of a case where the quantity of light entering the monitoring camera apparatus 101 is sufficient. Therefore, if the quantity of light entering the monitoring camera apparatus 101 is sufficient, the contents described with reference to FIG. 1 can be applied to even the night-time. Similarly, while it is described that FIG. 2 illustrates the behavior of monitoring in the night-time, the term "night-time" is a typical example of a case where the quantity of light entering the monitoring camera apparatus 101 is not sufficient. Therefore, if the quantity of light entering the monitoring camera apparatus 101 is not sufficient, the contents described with reference to FIG. 2 can be applied to even the daytime.

While, in the above-described exemplary embodiment, the controller 307 is provided inside the monitoring camera apparatus body 104, the controller 307 can be provided outside the monitoring camera apparatus 101 (for example, in the client apparatus 200).

Moreover, between steps S601 and S602 in the flowchart of FIG. 6, the controller 307 can determine whether the dome cover 102 is mounted at a predetermined position. In this case, the controller 307 receives, from the dimming mirror control unit 308, a result of detection about attachment or detachment of the dome cover 102. Then, if the result of detection detected by the controller 307 is a detection result indicating that the dome cover 102 is not mounted at a predetermined position of the monitoring camera apparatus 101, the controller 307 advances the processing not to step S602 but to step S613. In other words, the controller 307 does not perform RGB gain correction to the dome cover 102, and also does not perform voltage application (corresponding to "WITHOUT DOME" in FIG. 7). If the result of detection detected by the controller 307 is a detection result indicating that the dome cover 102 is mounted at the predetermined position of the monitoring camera apparatus 101, the controller 307 advances the processing to step S602. Furthermore, the determination as to whether the dome cover 102 is mounted at the predetermined position can be performed between steps S600 and S601.

While the processing illustrated in the flowchart of FIG. 6 uses the table illustrated in FIG. 7 (the correspondence table between the transmittance or reflectance and the RGB gains), the processing illustrated in FIG. 6 can be performed with use of a correspondence table between the transmittance or reflectance and cyan, magenta, yellow, and black (CMYK) gains.

While, in the above-described exemplary embodiment, the cover which covers the front surface of the monitoring camera 103 is configured as a dome cover, a cover not having a dome shape (semispherical shape) can be used. For example, the cover can have a box shape (rectangular parallelepiped shape). Moreover, the monitoring camera 103 can be the one that is unable to perform a pan operation or can be the one that is unable to perform a tilt operation.

The first exemplary embodiment can also be applied to a case where a camera other than cameras for monitoring is used. Moreover, the target for image capturing is not limited to a person.

<Advantageous Effect of First Exemplary Embodiment>

In the first exemplary embodiment, in a case where the quantity of light entering the dome cover 102 is sufficient as illustrated in FIG. 1, since the dome cover 102 is brought into the mirrored state by being colored (dimmed), such an anti-crime effect that the monitoring camera 103 is unlikely to be seen from the monitoring target 105 can be achieved.

In a case where the dome cover 102 has been colored, in the first exemplary embodiment, the color balance of a captured image is adjusted according to the transmittance of the dome cover 102. With the color balance adjusted, the color tone of a captured image acquired from light passing through the colored dome cover 102 is made appropriate. Therefore, compared to a case where the color balance is not adjusted, the image quality of a captured image can be improved. More specifically, in the first exemplary embodiment, the table 700 illustrated in FIG. 7 is used to perform color balance correction corresponding to a change in light spectrum (intensity distribution) caused by the transmittance (optical density). Therefore, the influence of coloring of the dome cover 102 on a captured image obtained by the monitoring camera 103 is removed or reduced. For example, an image captured when the dome cover 102 is in the mirrored state is prevented from becoming a totally bluish image.

Moreover, since the table 700 illustrated in FIG. 7 is used to perform color balance correction corresponding to a change in light spectrum caused by the transmittance, the influence of the dome cover 102 on functions such as white balance adjustment and light source presetting is reduced.

Furthermore, while, in the first exemplary embodiment, the color balance correction (color adjustment) using RGB gains has been described, the first exemplary embodiment can also be applied to a different color adjustment method. For example, the first exemplary embodiment can also be applied to a case where a detailed color profile used for adjustment using color differences is generated and color adjustment corresponding to the transmittance (reflectance) is performed.

The first exemplary embodiment can be applied to an existing monitoring camera and an existing network camera. For example, the first exemplary embodiment can be applied by adding, for example, the dimming mirror element, the dimming mirror control unit 308, and the controller 307 (a configuration which adjusts color balance) to an existing network camera.

Hereinafter, a camera system 100A according to a second exemplary embodiment is described with reference to FIG. 1, FIG. 8, and FIG. 9. The same constituent elements as those in the first exemplary embodiment are assigned the respective same reference characters, and the detailed description thereof is omitted. While, in the first exemplary embodiment, control with the temperature of the monitoring camera apparatus 101A taken into consideration is not performed, in the second exemplary embodiment, control with the temperature of the monitoring camera apparatus 101A taken into consideration is performed. More specifically, the reflectance of the dimming mirror element is adjusted to set the temperature of the monitoring camera apparatus 101A at an appropriate value. In the second exemplary embodiment, the monitoring camera apparatus 101A is assumed to be installed outdoors.

As illustrated in FIG. 1, the camera system 100A according to the second exemplary embodiment includes the monitoring camera apparatus 101A, the client apparatus 200, and the video recording server 300.

<Configuration of Monitoring Camera Apparatus>

Figure 8:
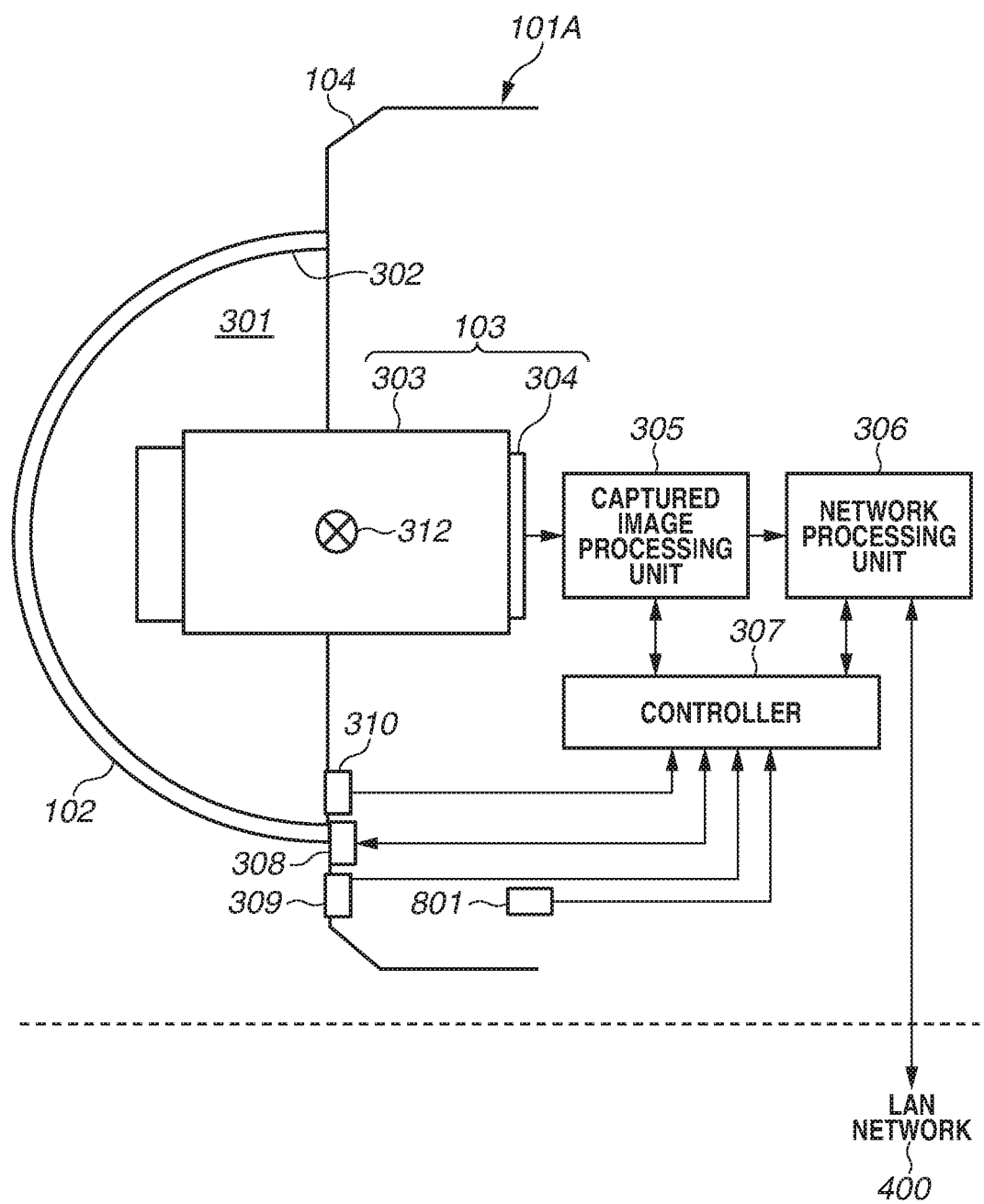
FIG. 8 is a block diagram of a monitoring camera apparatus according to a second exemplary embodiment.

As illustrated in FIG. 8, the monitoring camera apparatus 101A includes the dome cover 102, the monitoring camera 103, the captured image processing unit 305, the network processing unit 306, the controller 307, the dimming mirror control unit 308, the external environment light sensor 309, and the internal environment light sensor 310. The monitoring camera apparatus 101A in the second exemplary embodiment further includes a temperature sensor 801, which detects the internal temperature of the monitoring camera apparatus body 104. The temperature sensor 801 is provided inside the monitoring camera apparatus body 104. The temperature sensor 801 transmits a result of detection (the internal temperature of the monitoring camera apparatus body 104) to the controller 307. Furthermore, in the following description, the internal temperature of the monitoring camera apparatus body 104 is in some cases referred to as the "internal temperature of the monitoring camera apparatus 101A".

The temperature of the monitoring camera apparatus 101A, which is installed outdoors, may in some cases greatly increase due to exposure to direct sunlight. To prevent or reduce a temperature increase (to maintain the temperature of the monitoring camera apparatus 101A at a predetermined value or less), in the second exemplary embodiment, the reflectance of the dome cover 102 is controlled to block solar radiation. In other words, the reflectance of the dome cover 102 is controlled to adjust the temperature of the monitoring camera apparatus 101A.

<Comparison between Light-absorption Type Electrochromic Dimming Element and Dimming Mirror Element>

In a case where the dome cover is configured with a light-absorption type electrochromic dimming element, the dome cover performs a dimming operation with a dimming layer portion thereof being colored in dark blue and absorbing light. With the dimming layer portion absorbing light, the dome cover produces heat, and the produced heat is radiated to inside the monitoring camera apparatus (the inside of the domed cover), so that the temperature of the monitoring camera apparatus tends to increase.

In the second exemplary embodiment, the dome cover 102 is configured with a dimming mirror element. The dimming mirror element adjusts the transmittance for light by not absorbing light but reflecting light and is, therefore, able to be more efficiently block solar radiation. Furthermore, in a case where the outside air temperature is low (for example, in winter), it is possible to increase the temperature of the monitoring camera apparatus 101A by decreasing the reflectance of the dome cover 102 to take in solar radiation. In this way, controlling or adjusting the reflectance of the dimming mirror element enables adjusting the temperature of the monitoring camera apparatus 101A.

<Internal Operation of Monitoring Camera Apparatus>

Next, an example of an internal operation (processing) of the monitoring camera apparatus 101A in the second exemplary embodiment is described with reference to the flowchart of FIG. 9. The processing illustrated in the flowchart of FIG. 9 is performed by the CPU, which configures the controller 307, executing a program stored in the storage unit.

In step S900, the processing starts. The processing starts in response to, for example, the monitoring camera apparatus 101A being powered on. Alternatively, the processing starts in response to an instruction from the client apparatus 200.

In step S901, the controller 307 sets a target temperature. For example, the target temperature is input from the client apparatus 200 to the controller 307 via the LAN network 400.

Step S902 is the same as step S602 illustrated in FIG. 6, and step S903 is the same as step S603 illustrated in FIG. 6.

In step S904, the controller 307 calculates the current transmittance from the external environment light quantity acquired in step S902 and the internal environment light quantity acquired in step S903. Then, the controller 307 calculates the current reflectance from the calculated current transmittance.

In step S905, the controller 307 acquires the internal temperature β of the monitoring camera apparatus 101A from the temperature sensor 801.

In step S906, the controller 307 determines whether the internal temperature β of the monitoring camera apparatus 101A is equal to the target temperature. If it is determined that the internal temperature β of the monitoring camera apparatus 101A is equal to the target temperature (YES in step S906), the controller 307 returns the processing to step S902. In this case, the reflectance of the dome cover 102 is considered to be appropriate. In other words, if the internal temperature β of the monitoring camera apparatus 101A is equal to the target temperature, since it is not necessary to adjust the reflectance of the dome cover 102, the controller 307 does not perform reflectance control. If it is determined that the internal temperature β of the monitoring camera apparatus 101A is not equal to the target temperature (NO in step S906), the controller 307 advances the processing to step S907.

In step S907, the controller 307 determines whether the internal temperature β of the monitoring camera apparatus 101A is higher than the target temperature. If it is determined that the internal temperature β of the monitoring camera apparatus 101A is higher than the target temperature (YES in step S907), the controller 307 advances the processing to step S908. In a case where the internal temperature β of the monitoring camera apparatus 101A is higher than the target temperature, it becomes necessary to perform control to decrease the internal temperature β. If it is determined that the internal temperature β of the monitoring camera apparatus 101A is lower than the target temperature (NO in step S907), the controller 307 advances the processing to step S909. In a case where the internal temperature β of the monitoring camera apparatus 101A is lower than the target temperature, it becomes necessary to perform control to increase the internal temperature β.

In step S908, to decrease the internal temperature β of the monitoring camera apparatus 101A, the controller 307 performs control to increase the reflectance. For example, the controller 307 increase the value of a voltage to be applied from the dimming mirror control unit 308 to the dome cover 102. After step S908, the controller 307 returns the processing to step S902.

In step S909, to increase the internal temperature β of the monitoring camera apparatus 101A, the controller 307 performs control to decrease the reflectance. For example, the controller 307 decreases the value of a voltage to be applied from the dimming mirror control unit 308 to the dome cover 102. After step S909, the controller 307 returns the processing to step S902.

<Advantageous Effect of Second Exemplary Embodiment>

In the second exemplary embodiment, the reflectance of the dome cover 102 is adjusted based on the internal temperature β of the monitoring camera apparatus 101A. Specifically, if the internal temperature β is higher than an appropriate value (target temperature), the internal temperature β is caused to become equal to the appropriate value by increasing the reflectance of the dome cover 102. Moreover, if the internal temperature β is lower than the appropriate value (target temperature), the internal temperature β is caused to become equal to the appropriate value by decreasing the reflectance of the dome cover 102. In this way, according to the second exemplary embodiment, the internal temperature of the monitoring camera apparatus 101A is adjusted and maintained at the appropriate value, so that a malfunction of the monitoring camera apparatus 101A caused by the internal temperature of the monitoring camera apparatus 101A becoming too high or becoming too low can be prevented.

Furthermore, while, in the example illustrated in FIG. 8, one temperature sensor 801 is provided and the controller 307 uses only a temperature detected by the temperature sensor 801, the second exemplary embodiment is not limited to this configuration. For example, a plurality of temperature sensors can be provided inside the monitoring camera apparatus 101A, and the highest temperature (or the lowest temperature) of a plurality of detected temperatures can be used as the internal temperature β or the average value of a plurality of detected temperatures can be used as the internal temperature β.

While, in the above-described exemplary embodiment, the temperature sensor 801 detects the internal temperature of the monitoring camera apparatus body 104, the temperature of an empty space (air) 301 on the inner side of the dome cover 102 can be detected. Then, if the temperature of the empty space 301 is higher than the target temperature, the controller 307 can perform control in step S908, and, if the temperature of the empty space 301 is lower than the target temperature, the controller 307 can perform control in step S909. Alternatively, the temperature of the dome cover 102 can be detected, and the controller 307 can perform control in step S908 or S909 based on the detected temperature. Each of the internal temperature of the monitoring camera apparatus body 104, the temperature of the empty space 301 inside the dome cover 102, and the temperature of the dome cover 102 is an example of the temperature of the monitoring camera apparatus 101A.

Figure 9:
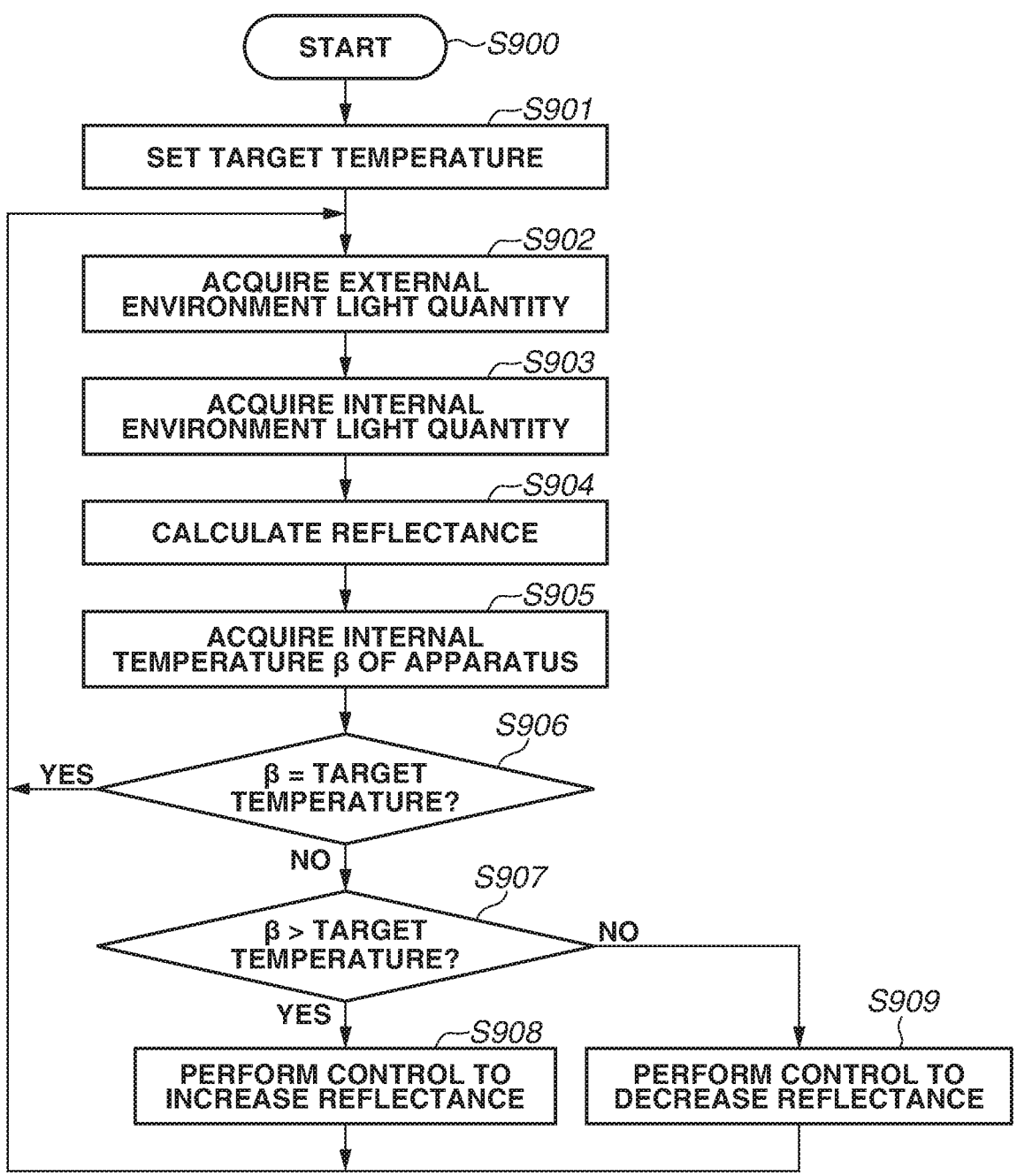
FIG. 9 is a flowchart illustrating an operation of the monitoring camera apparatus according to the second exemplary embodiment.

Following step S908 or S909 illustrated in FIG. 9, the controller 307 can perform color balance adjustment based on the transmittance of the dome cover 102.

Moreover, while, in the above description, the monitoring camera apparatus 101A is installed outdoors, the second exemplary embodiment is not limited to the monitoring camera apparatus 101A installed outdoors. The second exemplary embodiment can also be applied to a case where the monitoring camera apparatus 101A is installed, for example, indoors.

The second exemplary embodiment can be applied to an existing monitoring camera and an existing network camera. For example, the second exemplary embodiment can be applied by adding, for example, the dimming mirror element, the temperature sensor 801, the dimming mirror control unit 308, and the controller 307 to an existing network camera.

Figure 10:
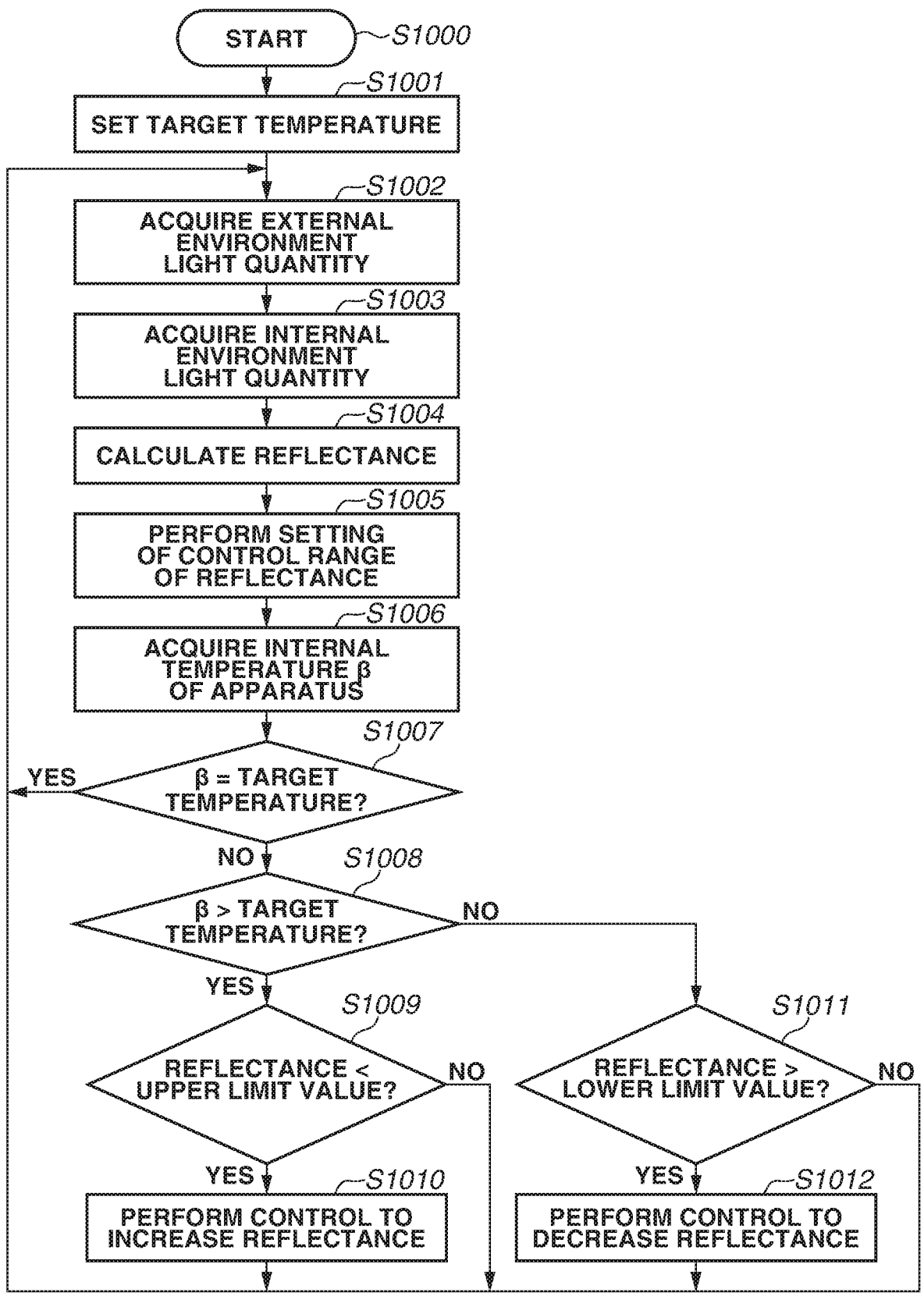
FIG. 10 is a flowchart illustrating an operation of a monitoring camera apparatus according to a third exemplary embodiment.

Next, a camera system 100A according to a third exemplary embodiment is described with reference to FIG. 10. The camera system 100A and the monitoring camera apparatus 101A in the third exemplary embodiment are similar to those in the second exemplary embodiment. The same constituent elements as those in the second exemplary embodiment are assigned the respective same reference characters, and the detailed description thereof is omitted.

In the third exemplary embodiment, the light quantity outside the dome cover 102 (the external environment light quantity) and the light quantity inside the dome cover 102 (the internal environment light quantity) are detected to determine control ranges of the transmittance and the reflectance. Then, whether to perform control to increase the reflectance and perform control to decrease the reflectance is determined based on the control ranges. In the dimming mirror element, since the degree of mirror effect is determined by the subject light quantity (the external environment light quantity) and the internal environment light quantity, the correspondence between the external environment light quantity and the transmittance (reflectance) available to achieve a blindfold effect is taken to set the control range of the transmittance (reflectance).

<Internal Operation of Monitoring Camera Apparatus>

An internal operation of the monitoring camera apparatus 101A according to the third exemplary embodiment is described with reference to the flowchart of FIG. 10.

Step S1000 is the same as step S900 illustrated in FIG. 9, step S1001 is the same as step S901 illustrated in FIG. 9, step S1002 is the same as step S902 illustrated in FIG. 9, step S1003 is the same as step S903 illustrated in FIG. 9, and step S1004 is the same as step S904 illustrated in FIG. 9.

In step S1005, the controller 307 performs setting of the control range of the reflectance (transmittance) of the dome cover 102 based on the external environment light quantity acquired in step S1002 and the internal environment light quantity acquired in step S1003.

Step S1006 is the same as step S905 illustrated in FIG. 9, and step S1007 is the same as step S906 illustrated in FIG. 9.

In step S1008, the controller 307 determines whether the internal temperature β of the monitoring camera apparatus 101A is higher than the target temperature. If it is determined that the internal temperature β of the monitoring camera apparatus 101A is higher than the target temperature (YES in step S1008), the controller 307 advances the processing to step S1009. If it is determined that the internal temperature β of the monitoring camera apparatus 101A is lower than the target temperature (NO in step S1008), the controller 307 advances the processing to step S1011.

In step S1009, the controller 307 determines whether the current reflectance is less than the upper limit value determined in step S1005. If it is determined that the current reflectance is less than the upper limit value (YES in step S1009), the controller 307 advances the processing to step S1010. If it is determined that the current reflectance is greater than or equal to the upper limit value (NO in step S1009), the controller 307 returns the processing to step S1002.

Step S1010 is the same as step S908 illustrated in FIG. 9. After step S1010, the controller 307 returns the processing to step S1002.

In step S1011, the controller 307 determines whether the current reflectance is greater than the lower limit value determined in step S1005. If it is determined that the current reflectance is greater than the lower limit value (YES in step S1011), the controller 307 advances the processing to step S1012. If it is determined that the current reflectance is less than or equal to the lower limit value (NO in step S1011), the controller 307 returns the processing to step S1002.

Step S1012 is the same as step S909 illustrated in FIG. 9. After step S1012, the controller 307 returns the processing to step S1002.

<Advantageous Effect of Third Exemplary Embodiment>

In the third exemplary embodiment, in a case where the internal temperature β of the monitoring camera apparatus 101A is higher than the target temperature, the controller 307 does not immediately perform control to increase the reflectance but determines whether the reflectance is less than the upper limit value. Then, only in a case where the reflectance is less than the upper limit value, the controller 307 performs control to increase the reflectance. Since the reflectance does not become greater than or equal to the upper limit value, an excessive increase in reflectance can be avoided. Moreover, in a case where the internal temperature β of the monitoring camera apparatus 101A is lower than the target temperature, the controller 307 does not immediately perform control to decrease the reflectance but determines whether the reflectance is greater than the lower limit value. Then, only in a case where the reflectance is greater than the lower limit value, the controller 307 performs control to decrease the reflectance. Since the reflectance does not become less than the lower limit value, a blindfold effect for the dome cover 102 is not impaired.

Furthermore, the captured image processing unit 305, the network processing unit 306, and the controller 307, which are illustrated in FIG. 3 and FIG. 8, can be implemented by software or hardware. In a case where they are implemented by software, a program for providing the functions of the respective units 305 to 307 is stored in a storage unit (for example, a ROM). The stored program is read out as appropriate onto a RAM and is then executed by a CPU which configures the controller 307, so that the functions of the respective units are implemented. On the other hand, in a case where they are implemented by hardware, for example, a predetermined compiler can be used to automatically produce a dedicated circuit on a Field Programmable Gate Array (FPGA) from a program for implementing the functions of the respective functional modules. Moreover, a gate array circuit can be formed in a similar way to the FPGA, and they can be implemented as hardware. Moreover, they can be implemented by an Application Specific Integrated Circuit (ASIC). Furthermore, the captured image processing unit 305, the network processing unit 306, and the controller 307, which are illustrated in FIG. 3 and FIG. 8, can be configured as a single functional module.

While, in the above-described exemplary embodiments, the monitoring camera apparatuses 101 and 101A have been described, the disclosure can be embodied (implemented) by other forms. For example, the disclosure can be implemented by supplying a program (computer program) for implementing one or more functions of the above-described exemplary embodiments to a system or apparatus via a network or a recording medium (storage medium) and causing one or more processors included in a computer of the system or apparatus to read and execute the program. In this case, the program (program code) itself read from the recording medium is configured to implement the functions of the exemplary embodiments. Moreover, the recording medium having the program recorded thereon can constitute the disclosure.

Moreover, not only the functions of the exemplary embodiments are implemented by the computer executing the read program, but also, for example, an operating system (OS) running on the computer can perform a part or the whole of actual processing based on an instruction of the program and the functions of the above-described exemplary embodiments can be implemented by such processing.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-073981 filed Apr. 6, 2018, which is hereby incorporated by reference herein in its entirety.

What is claimed is:

1. An imaging apparatus comprising:
a camera;
a cover covering the camera, capable of changing reflectance of a surface thereof and attachable to a case;
a processor; and
a memory coupled to the processor and storing instructions that, when executed by the processor, cause the processor to perform operations comprising:
changing the reflectance of the surface of the cover so as to be switchable between a first mode, which causes light to reflect at the surface of the cover, and a second mode, which causes light to pass through the cover and the reflectance in which is different from that in the first mode,
determining whether the cover is attached to the case,
acquiring transmittance for light passing through the cover and entering the camera, and
adjusting color balance of a captured image obtained by the camera, based on the transmittance, when it is determined that the cover is attached to the case.

2. The imaging apparatus according to claim 1, wherein the color balance is adjusted based on the reflectance of the cover instead of the transmittance.

3. The imaging apparatus according to claim 1, wherein the cover is formed from a material capable of changing the reflectance.

4. The imaging apparatus according to claim 1, wherein the cover is configured with a dimming mirror element or a light-absorption type electrochromic dimming element.

5. The imaging apparatus according to claim 1, wherein the cover is formed from a material incapable of changing the reflectance.

6. The imaging apparatus according to claim 5, wherein the cover is a smoke dome or a clear dome.

7. An imaging apparatus comprising:
a camera;
a cover covering the camera and capable of changing reflectance of a surface thereof;
a processor; and
a memory coupled to the processor and storing instructions that, when executed by the processor, cause the processor to perform operations comprising:
changing the reflectance of the surface of the cover so as to be switchable between a first mode, which causes light to reflect at the surface of the cover, and a second mode, which causes light to pass through the cover and the reflectance in which is different from that in the first mode,
detecting an internal temperature of the imaging apparatus,
wherein the reflectance of the cover is changed based on the detected temperature so as to maintain the internal temperature of the imaging apparatus.

8. The imaging apparatus according to claim 7, wherein, in a case where the detected temperature is higher than a target temperature, the reflectance of the cover is controlled to increase.

9. The imaging apparatus according to claim 7, wherein, in a case where the detected temperature is higher than a target temperature and the reflectance of the cover is less than a predetermined upper limit value, the reflectance of the cover is controlled to increase.

10. The imaging apparatus according to claim 7, wherein, in a case where the detected temperature is lower than a target temperature, the reflectance of the cover is controlled to decrease.

11. The imaging apparatus according to claim 7, wherein, in a case where the detected temperature is lower than a target temperature and the reflectance of the cover is greater than a predetermined lower limit value, the reflectance of the cover is controlled to decrease.

* * * * *